US008005073B2

(12) United States Patent
Kiss et al.

(10) Patent No.: US 8,005,073 B2
(45) Date of Patent: Aug. 23, 2011

(54) REPRESENTING NETWORK AVAILABILITY STATUS INFORMATION IN PRESENCE INFORMATION

(75) Inventors: Krisztian Kiss, Del-Mar, CA (US); Eva-Maria Leppanen, Lempäälä (FI)

(73) Assignee: Nokia Corporation, Espoo (FI)

( * ) Notice: Subject to any disclaimer, the term of this patent is extended or adjusted under 35 U.S.C. 154(b) by 614 days.

(21) Appl. No.: 11/448,763

(22) Filed: Jun. 8, 2006

(65) Prior Publication Data
US 2007/0189301 A1    Aug. 16, 2007

Related U.S. Application Data

(60) Provisional application No. 60/772,520, filed on Feb. 13, 2006.

(51) Int. Cl.
*H04L 12/66* (2006.01)

(52) U.S. Cl. ........ 370/352; 370/260; 370/329; 370/401; 370/216

(58) Field of Classification Search ................ 370/401, 370/392, 352, 260, 329, 216
See application file for complete search history.

(56) References Cited

U.S. PATENT DOCUMENTS

| | | | |
|---|---|---|---|
| 6,658,095 B1 * | 12/2003 | Yoakum et al. | 379/93.01 |
| 6,757,722 B2 * | 6/2004 | Lonnfors et al. | 709/220 |
| 6,868,094 B1 * | 3/2005 | Bordonaro et al. | 370/516 |
| 7,324,505 B2 * | 1/2008 | Hoover | 370/352 |
| 7,359,496 B2 * | 4/2008 | Qian et al. | 379/201.07 |
| 7,359,497 B2 * | 4/2008 | Morishima et al. | 379/202.01 |
| 7,412,522 B2 * | 8/2008 | Liscano et al. | 709/227 |
| 7,415,284 B2 * | 8/2008 | Hoover et al. | 455/518 |
| 7,430,179 B2 * | 9/2008 | Towns-von Stauber et al. | 370/252 |
| 7,567,553 B2 * | 7/2009 | Morris | 370/352 |

(Continued)

FOREIGN PATENT DOCUMENTS

WO    2004/008178    1/2004

(Continued)

OTHER PUBLICATIONS

Jack Nasielski; ("VoIP Standards for CDMA"); Feb. 2005; Qualcomm; pp. 1-40.*

(Continued)

*Primary Examiner* — Ricky Ngo
*Assistant Examiner* — Dewanda Samuel
(74) *Attorney, Agent, or Firm* — Mintz, Levin, Cohn, Ferris, Glovsky, and Popeo, P.C.

(57) ABSTRACT

A network element for handling network availability information represented as presence information, where the network element includes a receiving unit for receiving status information in a network availability element and a converting unit for converting the status information into a presence information data format. The network element also includes a generating unit for generating a request that includes the presence information data format. For certain status events the network availability includes at least one child. In one embodiment, the at least one child of the network availability element is a network element for presenting registration status and the network availability element is a part of a person element. The registration status is represented in a state element which includes one of an active element or a "terminated" element. In another embodiment, the at least one child of the network availability element is a network element for presenting registration status and the network availability element is a part of a device element. The registration status is represented in a state element which describes if a device is attached to a particular network and includes one of an active element, a "terminated" element or out-of-coverage element.

13 Claims, 5 Drawing Sheets

U.S. PATENT DOCUMENTS

| | | | |
|---|---|---|---|
| 7,583,685 B2* | 9/2009 | Ajitomi et al. | 370/401 |
| 2003/0018704 A1* | 1/2003 | Polychronidis et al. | 709/202 |
| 2003/0041101 A1* | 2/2003 | Hansche et al. | 709/203 |
| 2003/0110228 A1* | 6/2003 | Xu et al. | 709/207 |
| 2004/0071150 A1 | 4/2004 | Honkala et al. | |
| 2004/0122896 A1* | 6/2004 | Gourraud | 709/204 |
| 2004/0205212 A1* | 10/2004 | Huotari et al. | 709/230 |
| 2004/0267939 A1* | 12/2004 | Yumoto et al. | 709/227 |
| 2005/0080848 A1* | 4/2005 | Shah | 709/204 |
| 2005/0273499 A1* | 12/2005 | Goodman et al. | 709/206 |
| 2006/0030264 A1* | 2/2006 | Morris | 455/41.2 |
| 2006/0187931 A1* | 8/2006 | Hwang | 370/392 |
| 2007/0150441 A1* | 6/2007 | Morris | 707/3 |
| 2009/0213835 A1* | 8/2009 | Smith | 370/352 |

FOREIGN PATENT DOCUMENTS

| | | |
|---|---|---|
| WO | 2004/034718 | 4/2004 |

OTHER PUBLICATIONS

3rd Generation Partnership Project 2 "3GPP2"; ("Presence Service: Architecture and Functional Description"); 2004; p. 1-32.*

English translation of the Notice of Preliminary Rejection dated Sep. 28, 2009, issued in connection with counterpart Korean application No. 2008-7022374.

* cited by examiner

REPRESENTING NETWORK AVAILABILITY STATUS INFORMATION IN PRESENCE INFORMATION

BACKGROUND OF THE INVENTION

1. Field of the Invention

The present invention relates to how network availability information, including IP Multimedia subsystem registration status, out-of-coverage status, circuit switched attached status or packet switched attached status, is represented as presence information. In particular, the present invention is directed to the format of the network availability status for presence information data format representation.

2. Description of the Related Art

In an IP multimedia subsystem (IMS), a presence service provides the ability for a home network to manage presence information of a user's device, service, or service media, even while roaming. The presence service is a software system whose role is to collect and disseminate presence information, subject to a wide variety of controls. The user's presence information may be obtained through input from the user, information supplied by network entities, or information supplied by elements external to the home network. Currently, there is no solution of how network availability information, including IMS registration status, out-of-coverage status, circuit switched attached status or packet switched attached status, is represented as presence information.

SUMMARY OF THE INVENTION

An embodiment of the invention relates to a network element for handling network availability information represented as presence information. The network element includes a receiving unit for receiving status information from a network and a converting unit for converting the status information into a presence information data format. The network element also includes a generating unit for generating a request that includes the presence information data format. For certain status events the network element includes at least one child. In one embodiment, the at least one child of the network element is a network element for presenting registration status and the network element is a part of a person element. The registration status is represented in a state element which includes one of an active element or a "terminated" element. In another embodiment, the at least one child of the network element is a network element for presenting registration status and the network element is a part of a device element. The registration status is represented in a state element which describes if a device is attached to a particular network and includes one of an active element, a "terminated" element or out-of-coverage element.

Another embodiment of the invention relates to a method for handling network availability information represented as presence information. The method includes receiving status information from a network and converting the status information into a presence information data format. The method also includes generating a request that includes the presence information data format.

Another embodiment of the invention relates to a computer program embodied on a computer readable medium, the computer program being used for handling network availability information represented as presence information and for performing the method steps of receiving status information from a network, converting the status information into a presence information data format and generating a request that includes the presence information data format.

Another embodiment relates to a terminal for receiving network availability information to be represented as presence information. The terminal includes a unit for communicating with a network element for handling network availability information represented as presence information. The network element includes a receiving unit for receiving status information in a network availability element and a converting unit for converting the status information into a presence information data format. The network element also includes a generating unit for generating a request that includes the presence information data format.

Another embodiment of the invention relates to a server for receiving network availability information represented as presence information. The server includes a unit for communicating with a network element for handling network availability information represented as presence information. The network element includes a receiving unit for receiving status information in a network availability element, a converting unit for converting the status information into a presence information data format and a transmitting unit for transmitting the presence information data format to the server. The network element also includes a generating unit for generating a request that includes the presence information data format.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
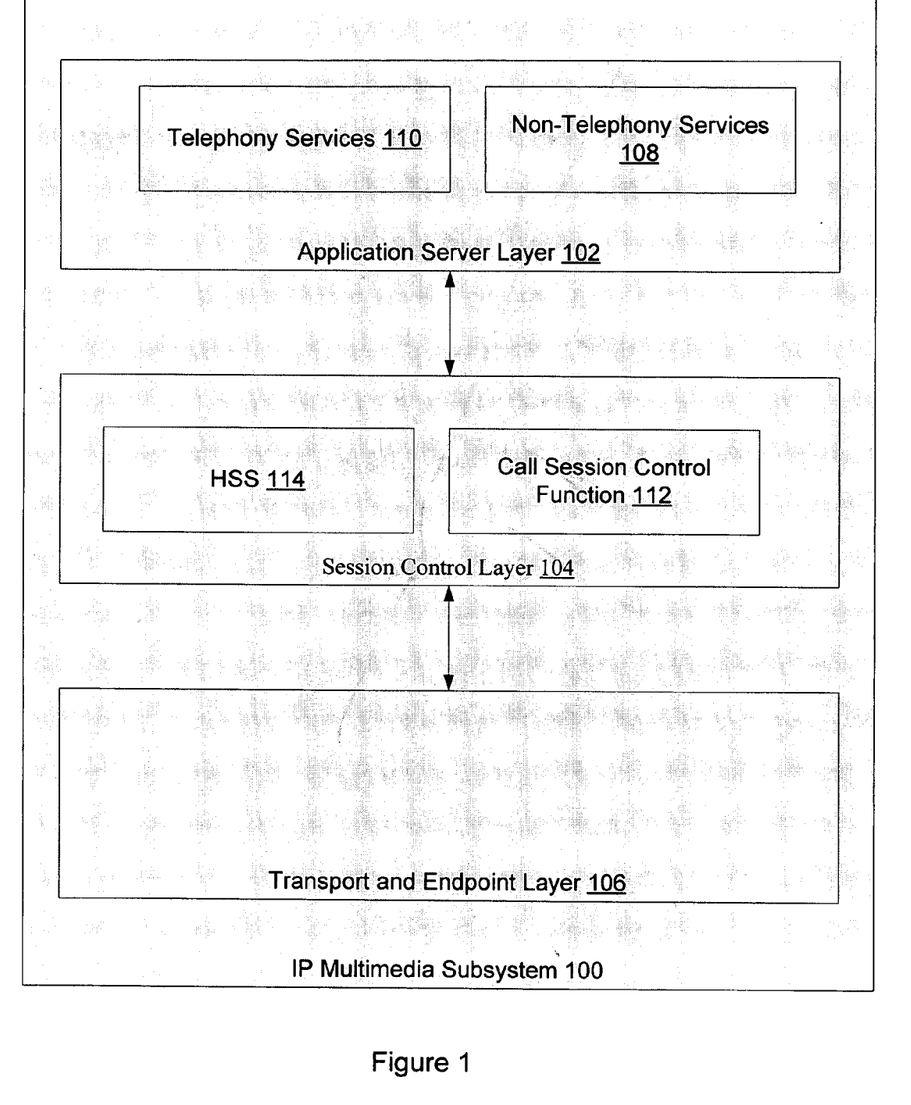
FIG. 1 illustrates an embodiment of an IP Multimedia subsystem in which embodiments of the present invention may be implemented.

FIG. 1 illustrates an embodiment of an IP Multimedia subsystem 100 in which embodiments of the present invention may be implemented. Subsystem 100 includes an application server layer 102, a session control layer 104 and a transport and endpoint layer 106. Subsystem 100 is a unified architecture that supports a wide range of services enabled by the flexibility of a Session Initiation Protocol (SIP). As shown in FIG. 1, the subsystem 100 can support multiple application servers providing traditional telephony services 108 and non-telephony services 110, such as instant messaging, push-to-talk, and video streaming. Transport and endpoint layer 106 initiates and terminates SIP signalling to set up sessions and provide bearer services such as, conversion of voice from analog or digital formats to Internet Protocol (IP) packets using Realtime Transport Protocol (RTP). Session control layer 104 includes a Call Session Control Function (CSCF) 112, which provides the registration of endpoints and routing of SIP signalling messages to an appropriate application server. CSCF 112 interworks with transport and endpoint layer 106 to guarantee Quality of Service across all services. Session control layer 104 also includes a Home Subscriber Server (HSS) database 114 that maintains the unique service profile for each end user. The end user's service profile stores all of the user service information and preferences in a central location, including an end user's current registration information, roaming information, telephony services, such as call forwarding information, instant messaging service information, such as buddies list, and voice mail box options. Application server layer 102 includes the application servers, which provide the end-user service logic.

In IP multimedia subsystem 100, an IP multimedia server receives information about a user's registration status via a third party registration and/or via subscribing for a registration event package. Specifically, to subscribe for a registration event package, the user equipment can register a public user identity at any time. However, the user equipment shall only initiate a new registration procedure when it has received a final response from a registrar for the ongoing registration, or a previous register request has timed out. The user equipment sends only the initial register requests to a port advertised to the user equipment during a Proxy CSCF (P-CSCF) discovery procedure. If the user equipment does not receive any specific port information during the P-CSCF discovery procedure, the user equipment sends the initial register request to Session Initiation Protocol (SIP) default port values. Upon receipt of a response to the initial registration, the user equipment subscribes to a registration event package for the public user identity registered at the user's registrar. The user equipment then uses the public user identity for the initial registration or a default public user identity for subscription to the registration-state event package, if the public user identity that was used for the initial registration is a barred public user identity.

Figure 2:
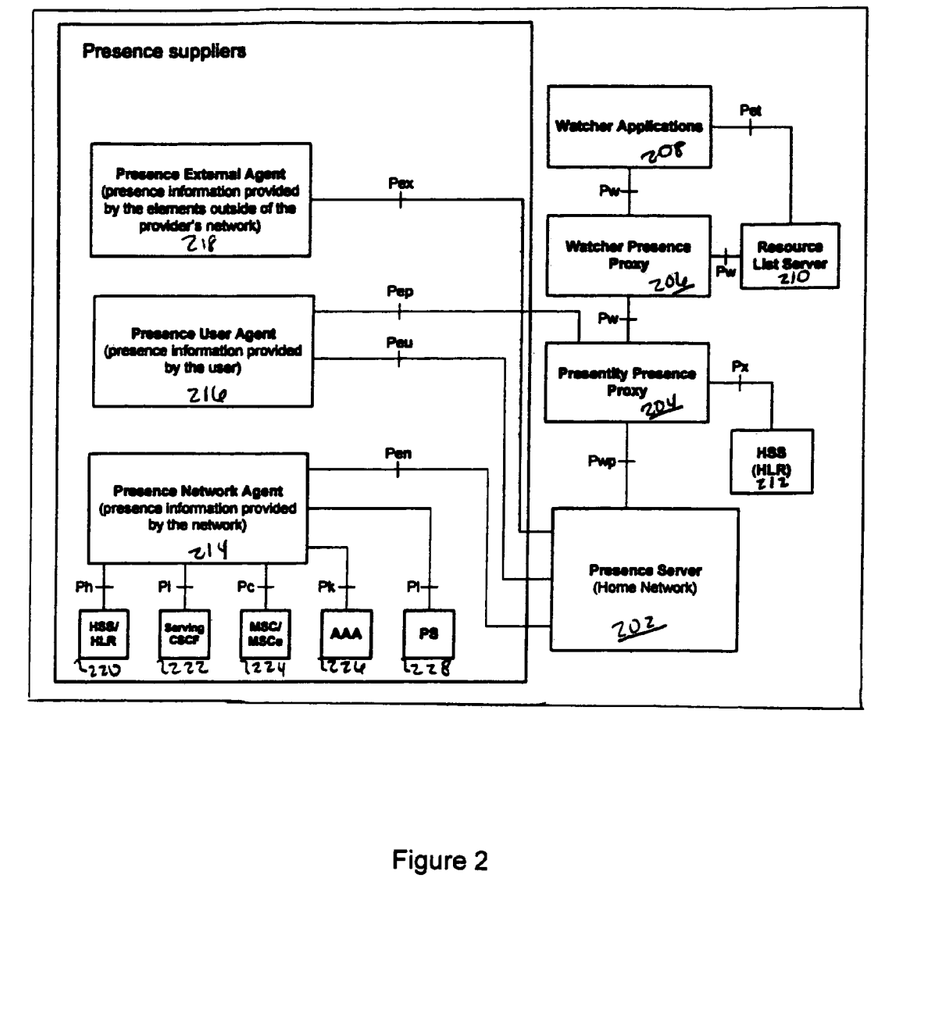
FIG. 2 illustrates an architectural model for providing presence services drawn by the $3^{rd}$ Generation Partnership Project (3GPP) and the $3^{rd}$ Generation Partnership Project 2 (3GPP2)

In subsystem 100, a presence network agent serves as an IMS application server and maintains the user's IMS registration status. FIG. 2 illustrates an architectural model for providing presence services, such as the capability to support management of presence information between watchers (described below) and presence entities, in order to enable applications and services to make use of presence information. Presence information is a dynamic set of information pertaining to a presence entity that may include presence elements such as status, reachability, and capabilities. Presence server 202 resides in the presence entity's home network and receives and manages presence information that is published by presence user agent 216, presence network agent 214 and presence external agent 218. Presence server 202 is network entity that is responsible for managing the presence information on behalf of the presence entity. Presence user agent 216 is a terminal or network-located agent that collects and sends user-related presence information to presence server 202 on behalf of a principal. Presence network agent 214 is a network element that collects and sends network-related presence information on behalf of a presence entity to presence server 202. Presence external agent 218 collects presence information provided by elements outside of a provider's network. Upon receiving presence information from entities 214-218, presence server 202 is responsible for composing the presence-related information for a certain presence entity into a single presence document.

Presence server 202 allows watcher applications 208 and watcher presence proxy 206 to request and subscribe to either a full set of presence information for a presence entity, or to certain information within the full set. Watcher 208 is an entity that subscribes for the presence information associated with one presence entity or a list of presence entities. Presence server 202 provides a subscription authorization policy that determines which watchers 208 are allowed to subscribe to the presence entity's presence information. The subscription authorization policy also determines which tuples of the presence entity's presence information the watcher has access to. Presence server 202 supports SIP-based communications for publishing presence information. Specifically, presence server 202 supports SIP-based communications with presence entity proxy 204. Presence entity proxy 204 is a SIP application server.

As shown in FIG. 2, presence network agent is connected to Serving CSCF (S-CSCF) 222 via a Pi interface, to Home Location Register (HSS/HLR) 220 via a Ph interface, to a Mobile Switching Center (MSC) 224 via a Pc interface, to an Authentication, Authorization and Accounting (AAA) entity 226 via a Pk interface and to Packet Switched (PS) entity 228 via a PI interface. Ph interface allows presence network agent 214 to query HSS/HLR 220 about the state and status of a subscriber, associated with the presence entity, from a circuit switched domain, packet switched domain and IMS perspective. Pi interface allows the S-CSCF 222 to provide IMS-specific presence information, for example about ongoing IMS sessions. Pc interface allows the MSC/MSCe 224 to report mobility management related events to presence network agent 214 and may allow MSC/MSCe 224 to report call related events. Pk interface allows AAA 226 to report presence related events to presence network agent 214. PI interface is used by presence network agent to retrieve location information related to a subscriber, associated with the presence entity. Through these interfaces, presence network agent is thus aware of further network availability information about the presence entity. For example, if one of the devices of the presence entity is circuit switched or packet switched attached, or if it is out-of-coverage.

Presence network agent 214 is also connected to presence server 202 via Pen interface; presence user agent is connected to presence server 202 via a Peu interface and to presence entity presence proxy 204 via a Pep interface; and presence external agent is connected to presence server 202 via a Pex interface. Pen, Pex and Pep interfaces allow the presence entity's presence information to be supplied to presence server 202. Peu interface allows presence user agent 216 to manage subscription authorization policy and hard state presence information. Presence entity presence proxy 204 is further connected to a home location register (212) via a Px interface. Watcher applications 208 and watcher presence proxy 206 are connected to each other and to presence entity presence proxy 204 and Resource List Server 210 via a Pw interface. Px interface assists in locating the presence server of the presence entity and Pw interface allows a watcher application 208 to request and obtain presence information. Watcher applications 208 are also connected to resource list server 210 via Pet interface which allows watcher applications 208 to manage resource list information in resource list server 210.

Figure 3:
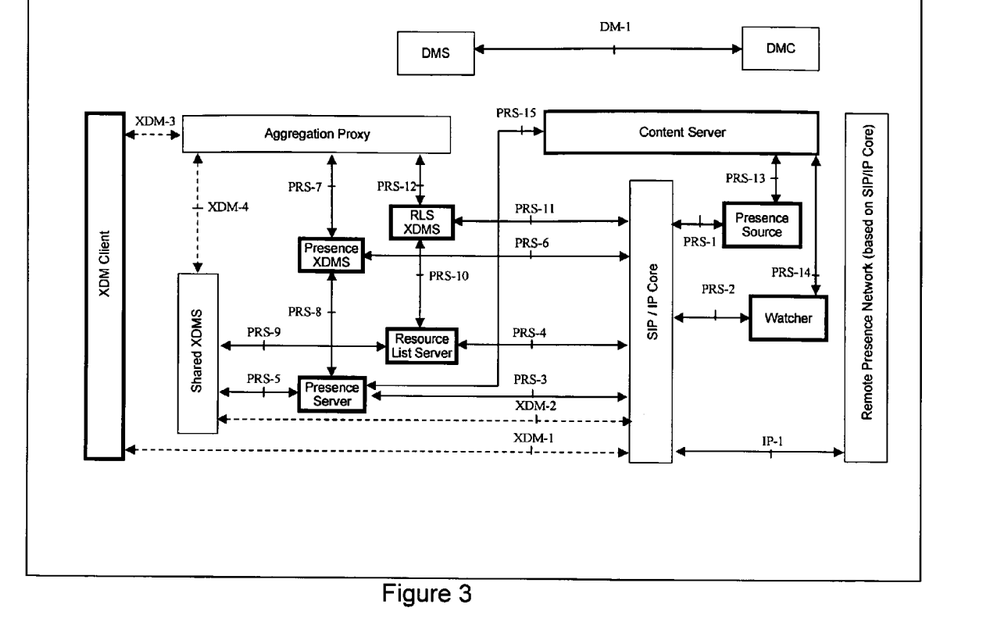
FIG. 3 illustrates another Open Mobile Alliance architectural model for providing presence services drawn by the Open Mobile Alliance (OMA), onto which the architectural model of FIG. 2 is mapped.

In an embodiment of the present invention, the architecture of FIG. 2 may be mapped into an Open Mobile Alliance presence architecture, as illustrated in FIG. 3. As shown, Open Mobile Alliance presence architecture of FIG. 3 includes a presence server 302 that accepts and stores presence information published to it and distributes the presence information and watcher information; a presence source 304 that provides presence information to a presence service, a watcher 306 that requests presence information from a presence entity or watcher information about a watcher from the Presence Service. The architecture of FIG. 3 also includes a resource list server 308 that accepts and manages subscriptions to presence lists, which enables a watcher application to subscribe to the presence information of multiple presence entities using a single subscription transaction, a Presence XML Document Management Server (XDMS) 312 and a RLS Document Management Server (RDMS) 310. The Open Mobile Alliance presence architecture of FIG. 3 further includes a content server 314, a SIP/IP core network 316 that includes a network of servers that perform a variety of services in support of the presence service, a shared XML Data Management Server (XDMS) 318, an aggregation proxy 320, a Device Management Server (DMS) 322, a Device Management Client (DMC) 324, a XDM Client 326 and a remote presence network 328. In the Open Mobile Alliance presence architecture, components 302-306 are interconnected by interfaces PRS-1 to PRS-15 and XDM-1 to XDM 4. SIP/IP core network is also connected to remote presence network 328 by interface IP-1 and DMS 322 and DMC 324 are connected by interface DM-1.

In the Open Mobile Alliance presence architecture, the Pen interface is equivalent to a PRS-1 and PRS-3 interface combination. PRS-1 interface and the PRS-3 interface each supports communication between presence sources and an SIP/IP core network. The protocol for the PRS-1 interface is SIP and the traffic is routed to presence server 202 via the SIP/IP core network. Thus, presence network agent is implemented by the Open Mobile Alliance defined presence source, which uses a SIP PUBLISH request to send network availability information, for example, IMS registration status, to presence server 202. At presence server 202, the network availability information becomes part of the presence entity's presence information due to presence server 202 composition policy procedures.

An embodiment of the present invention specifies the format of the network availability status information for presence information data format representation. Using this format, presence network agent 214 may convert the received status information into the presence information data format. For example, presence network agent 214 may convert status information in a third party REGISTER request or a NOTIFY request for a registration event package over the Pi interface, or some other means over another interface, into the presence information data format. In an embodiment of the invention, the network availability status information is inserted as part of an already defined network availability element. An example of the defined network availability elements is the "network-availability" element defined in the Open Mobile Alliance specification. As is known to those skilled in the art, a device may be connected to one or more networks, such as a GSM, CDMA, GPRS or 802.11x. However, connectivity to a network cannot be defined in a generic manner, as different states may exist for different networks. Therefore, the already defined network element is defined in a generic and extensible manner. Specifically, the predefined network availability element includes an identifier attribute, whose value is used to indicate a network type. This value is registered with the Open Mobile Alliance network architecture, such that it is unique for that type of network. Additionally, each network type will need to define the meaning of being connected, as well as any additional information that is relevant for that type of network.

An embodiment of the invention also defines a concrete "network" element as a child of the "network-availability" element representing IMS network availability for IMS registration status. Because the IMS registration status information is associated with the IMS user, wherein in the particular case of presence information, the IMS user is the presence entity itself, the network availability element including IMS registration information has to be part of a "person" element and not a "device" element. According to an embodiment of the invention, the actual registration status is represented by a "state" element, which can have a child element, such as an "active" element when the presence entity is IMS registered or a "terminate" element, when the presence entity does not have a valid IMS registration. When presence network agent 214 receives a third party REGISTER request or a NOTIFY request for the registration event package informing presence network agent 214 about the presence entity's registration status, presence network agent 214 has to generate a PUBLISH request including a presence information data format document with the above described elements.

For example, if a presence entity, "sip:someone@example.com", has an active registration status and presence network agent 214 receives a third party REGISTER request for "sip:someone@example.com", including an "Expires" header with a value greater than zero or a NOTIFY request for the registration event package with an XML body, presence network agent 214 converts the information into presence information data format and sends a PUBLISH request to presence server 202. The NOTIFY request for the registration event package, in this example, has the XML body of:

```
<?xml version="1.0"?>
    <reginfo xmlns="urn:ietf:params:xml:ns:reginfo"
            version="0" state="full">
        <registration aor="sip:someone@example.com" id="as9"
                state="active">
            <contact id="76" state="active" event="registered">
                <uri> sip:[5555::aaa:bbb:ccc:ddd]</uri>
            </contact>
        </registration>
    </reginfo>
```

The presence information data format representation, of this example, is:

```
<?xml version="1.0" encoding="UTF-8"?>
<presence xmlns="urn:ietf:params:xml:ns:pidf"
    xmlns:pdm="urn:ietf:params:xml:ns:pidf:data-model"
    xmlns:op2="urn:oma:params:xml:ns:pidf:oma-pres2"
    entity="sip:someone@example.com">
<pdm:person id="a1233">
        <op2:network-availability>
            <op2:network id="IMS">
                <op2:state><op2:active/></op2:state>
            </op2:network>
        </op2:network-availability>
        <pdm:timestamp>2005-02-22T20:07:07Z</pdm:timestamp>
    </pdm:person>
    </presence>
```

According to an embodiment of the invention, for network availability status information in circuit switched (CS) or packet switched (PS) networks, two more concrete "network" elements are defined as children of the "network-availability" element and the "id" attribute takes the value of "CS" or "PS". In this embodiment, the "network-availability" element is a part of a "device" element, as now it describes the status of a particular device. As a previously defined "state" element is meant to describe the basic status information for any type of networks, the "state" element is used in this embodiment to describe if a device is attached to a particular circuit switched or packet switched network. In these networks, an out-of-coverage child element is defined for the state element. Two example scenarios are:

```
<?xml version="1.0" encoding="UTF-8"?>
<presence xmlns="urn:ietf:params:xml:ns:pidf"
    xmlns:pdm="urn:ietf:params:xml:ns:pidf:data-model"
    xmlns:op="urn:oma:params:xml:ns:pidf:oma-pres"
    xmlns:op2="urn:oma:params:xml:ns:pidf:oma-pres2"
    entity="sip:someone@example.com">
    <pdm:device id="a1233">
        <op:network-availability>
            <op:network id="PS">
                <op2:state><op2:terminated/></op2:state>
            </op:network>
        </op:network-availability>
        <pdm:timestamp>2005-02-22T20:07:07Z</pdm:timestamp>
    </pdm:device>
</presence>
<?xml version="1.0" encoding="UTF-8"?>
<presence xmlns="urn:ietf:params:xml:ns:pidf"
    xmlns:pdm="urn:ietf:params:xml:ns:pidf:data-model"
    xmlns:op="urn:oma:params:xml:ns:pidf:oma-pres"
    xmlns:op2="urn:oma:params:xml:ns:pidf:oma-pres2"
    entity="sip:someone@example.com">
    <pdm:device id="a1233">
        <op:network-availability>
            <op:network id="CS">
                <op2:state><op2:out-of-coverage/></op2:state>
            </op:network>
        </op:network-availability>
        <pdm:timestamp>2005-02-22T20:07:07Z</pdm:timestamp>
    </pdm:device>
</presence>
```

The following XML schema is defined in an Open Mobile Alliance SIMPLE Presence 2.0 enabler in order to implement the present invention:

```
<?xml version="1.0" encoding="UTF-8"?>
<xs:schema targetNamespace="urn:oma:params:xml:ns:pidf:oma-pres2"
        xmlns="urn:oma:params:xml:ns:pidf:oma-pres2"
        xmlns:xs="http://www.w3.org/2001/XMLSchema"
        elementFormDefault="qualified"
        attributeFormDefault="unqualified">
    <!-- This import brings in the XML language attribute xml:lang-->
    <xs:import namespace="http://www.w3.org/XML/1998/namespace"
schemaLocation="http://www.w3.org/2001/xml.xsd"/>
    <xs:annotation>
        <xs:documentation xml:lang="en">
            XML Schema definition for OMA Presence 2.0 extensions to
OMA Presence 1.0 and PIDF and Presence Data
Model</xs:documentation>
    </xs:annotation>
<xs:complexType name="emptyType"/>
<xs:complexType name="stateType">
    <xs:sequence maxOccurs="unbounded">
        <xs:element name="active" type="emptyType" minOccurs="0"/>
        <xs:element name="terminated" type="emptyType"
            minOccurs="0"/>
        <xs:element name="out-of-coverage" type="emptyType"
            minOccurs="0"/>
        <xs:any namespace="##other" processContents="lax"
minOccurs="0" maxOccurs="unbounded"/>
    </xs:sequence>
</xs:complexType>
<!-- OMA extensions to PDM person element -->
<xs:element name="network-availability">
    <xs:complexType>
```

-continued

```
        <xs:sequence>
            <xs:element name="network" minOccurs="0"
                maxOccurs="unbounded">
                <xs:complexType>
                    <xs:sequence>
                        <xs:any namespace="##other" processContents="lax"
minOccurs="0" maxOccurs="unbounded"/>
                        <xs:element name="state" type="stateType"
                            minOccurs="0"/>
                    </xs:sequence>
                    <xs:attribute name="id" type="xs:token" use="required"/>
                </xs:complexType>
            </xs:element>
            <xs:any namespace="##other" processContents="lax"
minOccurs="0" maxOccurs="unbounded"/>
        </xs:sequence>
    </xs:complexType>
</xs:element>
</xs:schema>
```

Figure 4:
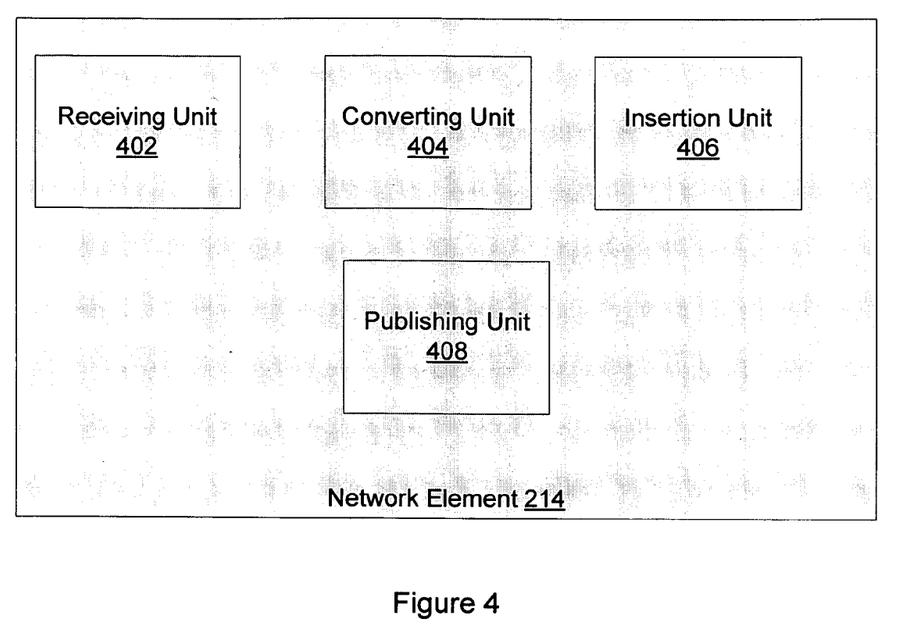
FIG. 4 illustrates steps implemented in an embodiment of the present invention.

FIG. 4 further illustrates component used in presence network agent in an embodiment of the present invention. Presence network agent 214 includes a receiving component 402 for receiving status information from another network element. Presence network agent 214 may also include a conversion unit 404, that may be in communication with receiving unit 402, for converting the received status information into the presence information data format. An insertion unit 406 inserts the network availability status information as part of an already defined network availability element. An embodiment of the invention also defines a concrete "network" element as a child of the "network-availability" element representing IMS network availability for IMS registration status. A publishing unit 408 generates a PUBLISH request including a presence information data format document, when presence network agent 214 receives a third party REGISTER request or a NOTIFY request for the registration event package informing presence network agent 214 about the presence entity's registration status.

Figure 5:
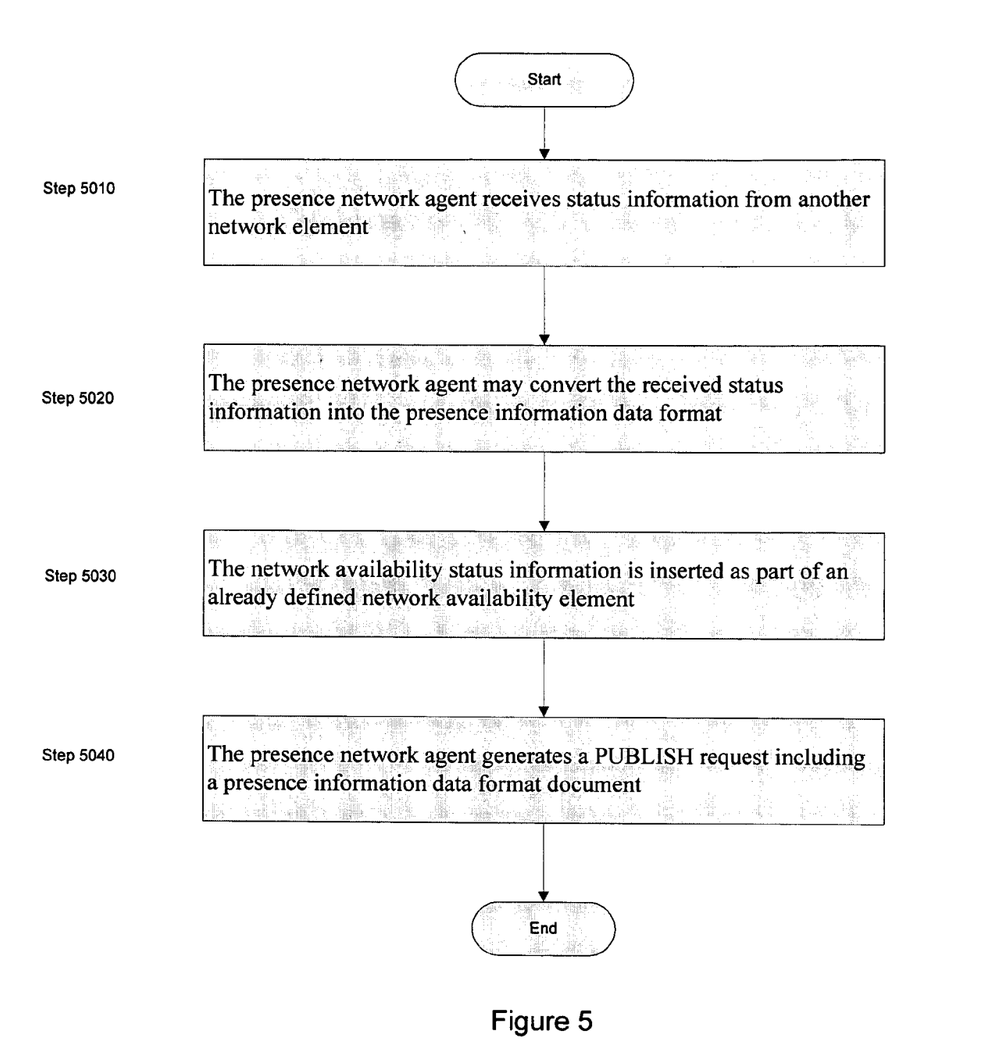
FIG. 5 illustrates steps implemented in an embodiment of the present invention.

FIG. 5 illustrates steps implemented in an embodiment of the present invention. In Step 5010, presence network agent 214 receives status information from another network element. In Step 5020, presence network agent may convert the received status information into the presence information data format. In Step 5030, the network availability status information is inserted as part of an already defined network availability element. An embodiment of the invention also defines a concrete "network" element as a child of the "network-availability" element representing IMS network availability for IMS registration status. In Step 5040, when presence network agent 214 receives a third party REGISTER request or a NOTIFY request for the registration event package informing presence network agent 214 about the presence entity's registration status, presence network agent 214 has to generate a PUBLISH request including a presence information data format document with the above described elements.

The present invention, therefore, provides a method for representing network availability in presence information. This information specifies the "default" availability status of the user or device. If a particular service does not have a representation in presence information, i.e., no tuple element, then the status information can be used to indicate if the user is available for circuit switched, packet switched or IMS services in general.

It should be appreciated by one skilled in art, that the present invention may be utilized in any device that implements the network availability information described above.

The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed:

1. An apparatus, comprising:
   a receiver, at a presence network agent configured in accordance with an open mobile alliance presence architecture, configured to receive status information from a plurality of network elements of a wireless network, the plurality of network elements comprising one or more session control layer network elements maintaining status and presence data for subscribers of the wireless network, the one or more session control layer network elements including at least one of a home subscriber server and a call session control function, the status information received from the plurality of network elements enabling determination of presence information for the subscribers based on information from a plurality of sources;
   a converter configured to convert the presence information which is based on the status information;
   an insertion unit configured to insert the status information as a part of a predefined network availability element, wherein for certain status events the network availability element comprises at least one child element defining the current state; and
   a publishing unit, at the presence network agent, configured to publish a request including network-related presence data information and to transmit the published request, through an interface configured as a Pen interface compliant with the open mobile alliance presence architecture, to a presence server configured to store and manage presence information published to it from a plurality of presence agents, including the request published by the publishing unit of the presence network agent, the published request transmitted from the publishing unit of the presence network agent including the network-related presence data converted from status information provided by the at least one of the home subscriber server and the call session control function of the wireless network.

2. The apparatus of claim 1, wherein the at least one child element is configured to represent network availability for registration status associated with a user which is a presence entity, thereby allowing the network availability element which includes the registration information to be part of a person element.

3. The apparatus of claim 1, wherein the network availability element is configured to represent a registration status in a state element which comprises one of an active element when a presence entity is registered or a terminated element when the presence entity does not have a valid registration.

4. The apparatus of claim 1, wherein the at least one child of the apparatus is configured as a network element to present registration status, and the network availability element is configured as a part of a device element that represents a status of a specific device, wherein an identifier attribute of the network availability element defines a type of network to which the device is attached.

5. The apparatus of claim 4, wherein the at least one child of the network is configured as a state apparatus which describes if a device is attached to a particular network and includes one of an active element, a terminated element or out-of-coverage element.

6. A method, comprising:
   receiving, at a presence network agent configured in accordance with an open mobile alliance presence architecture, status information from a plurality of network elements of a wireless network, the plurality of network elements comprising one or more session control layer network elements maintaining status and presence data for subscribers of the wireless network, the one or more session control layer network elements including at least one of a home subscriber server and a call session control function, the status information received from the plurality of network elements enabling determination of presence information for the subscribers based on information from a plurality of sources;
   converting the status information into the presence information data format;
   inserting the status information as a part of a predefined network availability element, wherein for certain status events the network availability element comprises at least one child; and
   publishing, at the presence network agent, a request including network-related presence data information and transmitting the published request, through an interface configured as a Pen interface compliant with the open mobile alliance presence architecture, to a presence server configured to store and manage presence information published to it from a plurality of presence agents, including the request published by the presence network agent, the published request transmitted from a publishing unit of the presence network agent including the network-related presence data converted from status information provided by the at least one of the home subscriber server and the call session control function of the wireless network.

7. The method of claim 6, further comprising:
   representing network availability for registration status associated with a user which is a presence entity, thereby allowing the network availability element which includes the registration information to be part of a person element.

8. The method of claim 6, further comprising:
   representing a registration status in a state element which comprises one of an active element when a presence entity is registered or a terminated element when the presence entity does not have a valid registration.

9. The method of claim 6, further comprising:
   configuring the at least one child of the apparatus as a network element to present registration status and configuring the network availability element as a part of a device element that defines a status of a specific device, wherein an identifier attribute of the network availability element defines a type of network to which the device is attached.

10. The method of claim 9, further comprising:
    configuring the at least one child of the network as a state network element which determines if a device is attached to a particular network and includes one of an active element, a terminated element or out-of-coverage element.

11. An apparatus, comprising:
    receiving means for receiving, at a presence network agent configured in accordance with an open mobile alliance presence architecture, status information from a plurality of network elements of a wireless network, the plurality of network elements comprising one or more session control layer network elements maintaining status and presence data for subscribers of the wireless network, the one or more session control layer network elements including at least one of a home subscriber server and a call session control function, the status information received from the plurality of network elements enabling determination of presence information for the subscribers based on information from a plurality of sources;

converting means for converting the status information into the presence information data format;

inserting means for inserting the status information as a part of a predefined network availability element, wherein for certain status events the network availability element comprises at least one child; and publishing means, at the presence network agent, for publishing a request including network-related presence data information and transmitting, through an interface configured as a Pen interface compliant with the open mobile alliance presence architecture, the published request to a presence server configured to store and manage presence information published to it from a plurality of presence agents, including the request published by the presence network agent, the published request transmitted from the publishing means of the presence network agent including the network-related presence data converted from status information provided by the at least one of the home subscriber server and the call session control function of the wireless network.

12. A computer program embodied on a non-transitory computer readable storage medium, the computer program configured to control a processor to perform a process comprising:

receiving, at a presence network agent configured in accordance with an open mobile alliance presence architecture, status information from a plurality of network elements of a wireless network, the plurality of network elements comprising one or more session control layer network elements maintaining status and presence data for subscribers of the wireless network, the one or more session control layer network elements including at least one of a home subscriber server and a call session control function, the status information received from the plurality of network elements enabling determination of presence information for the subscribers based on information from a plurality of sources;

converting the status information into the presence information data format;

inserting the status information as a part of a predefined network availability element, wherein for certain status events the network availability element comprises at least one child; and publishing, at the presence network agent, a request including network-related presence data information and transmitting, through an interface configured as a Pen interface compliant with the open mobile alliance presence architecture, the published request to a presence server configured to store and manage presence information published to it from a plurality of presence agents, including the request published by the presence network agent, the published request transmitted from a publishing unit of the presence network agent including the network-related presence data converted from status information provided by the at least one of the home subscriber server and the call session control function of the wireless network.

13. A method, comprising:

receiving, at a presence network agent conforming to the open mobile alliance presence architecture, a user status information from a network node, the network node being one of a plurality of network elements of a wireless network, the plurality of network elements comprising one or more session control layer network elements maintaining status and presence data for subscribers of the wireless network, the one or more session control layer network elements including at least one of a home subscriber server and a call session control function, the status information received from the plurality of network elements enabling determination of presence information for the subscribers based on information from a plurality of sources, wherein the user status information comprises the user state;

converting the user status information received from the network node into the user presence information format;

storing the user presence information in a presence document, wherein the presence document is an extended markup language presence document, wherein the extended markup language presence document comprises extended markup language elements, wherein the user status information is stored as an extended markup language network element, wherein the extended markup language network element is part of an extended markup language device or user element; and sending, by the presence network agent, the extended markup language presence document to a presence server configured to store and manage presence information published to it from a plurality of presence agents, including the presence document from the presence network agent, wherein the extended markup language document is sent to the presence server via an interface configured as a Pen interface, the extended markup language presence document, sent from the presence network agent, including presence data converted from status information provided by the at least one of the home subscriber server and the call session control function of the wireless network.

* * * * *